C. E. HUBER.
SLEIGH ATTACHMENT FOR VEHICLES.
APPLICATION FILED JULY 11, 1910.

1,021,719.

Patented Mar. 26, 1912.

2 SHEETS—SHEET 1.

Witnesses
M. E. Shook.
Ernest Hutchinson

Inventor
Clarence E. Huber,
By Edson Bro's
Attorneys

C. E. HUBER.
SLEIGH ATTACHMENT FOR VEHICLES.
APPLICATION FILED JULY 11, 1910.
1,021,719.
Patented Mar. 26, 1912.
2 SHEETS—SHEET 2.
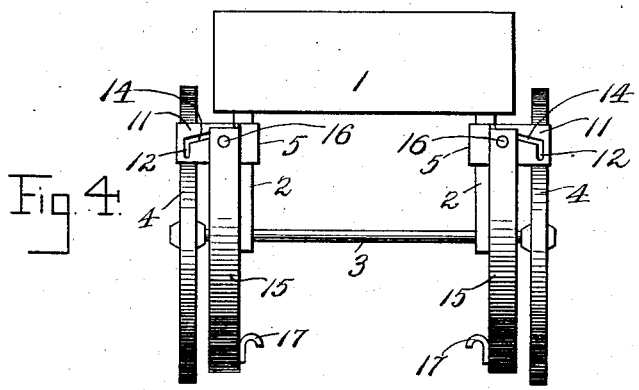
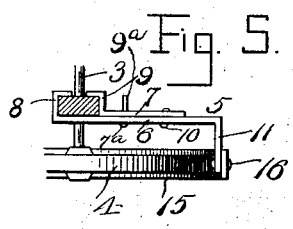
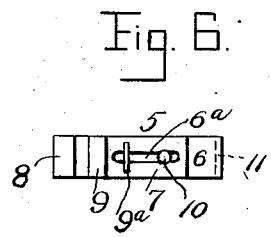
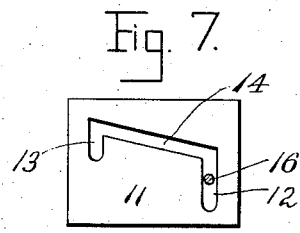
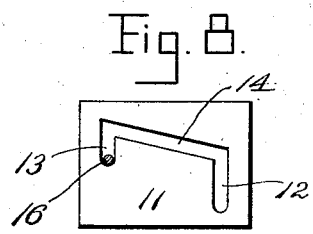
Witnesses
M. E. Shook
Ernest P. Hutchinson
Inventor
Clarence E. Huber,
By Edson Bros,
Attorneys.
COLUMBIA PLANOGRAPH CO., WASHINGTON, D. C.

UNITED STATES PATENT OFFICE.

CLARENCE E. HUBER, OF MANSFIELD, OHIO, ASSIGNOR OF ONE-THIRD TO JACOB HUBER AND ONE-THIRD TO HARVEY M. HUBER, OF MANSFIELD, OHIO.

SLEIGH ATTACHMENT FOR VEHICLES.

1,021,719.  Specification of Letters Patent.  Patented Mar. 26, 1912.

Application filed July 11, 1910. Serial No. 571,470.

*To all whom it may concern:*

Be it known that I, CLARENCE E. HUBER, a citizen of the United States, residing at Mansfield, in the county of Richland and State of Ohio, have invented certain new and useful Improvements in Sleigh Attachments for Vehicles; and I do hereby declare the following to be a full, clear, and exact description of the invention, such as will enable others skilled in the art to which it appertains to make and use the same.

My invention relates to a sleigh attachment for vehicles.

It has for its object to provide an inexpensive and simply constructed attachment for carts and other vehicles whereby the supports of the vehicle may be quickly changed from wheels to runners and vice versa.

Another object is to provide improved means for supporting the runners when not in use as well as when they are being employed to support the vehicle.

The invention consists in the features of construction and combinations of parts hereinafter described and specified in the claims.

Figure 1:
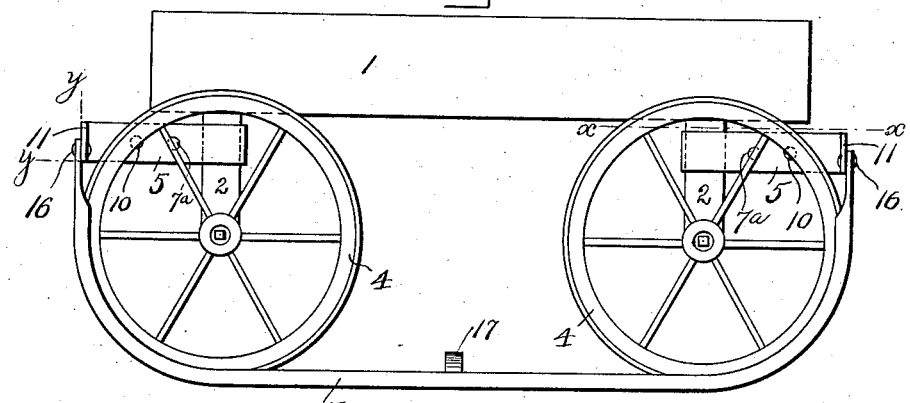
Figure 2:
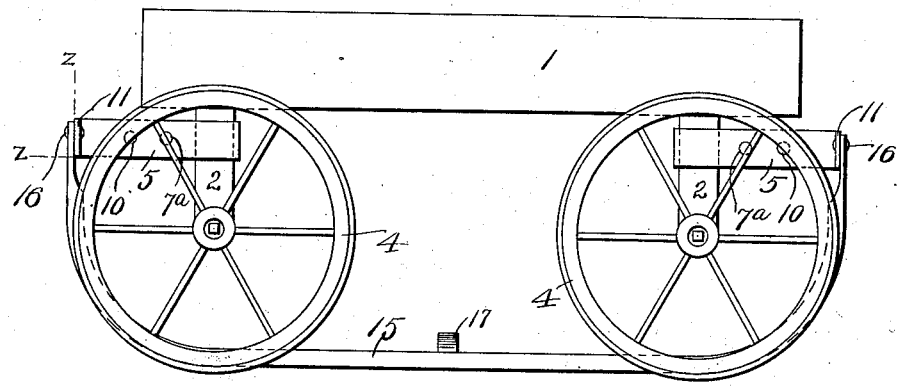
Figure 3:
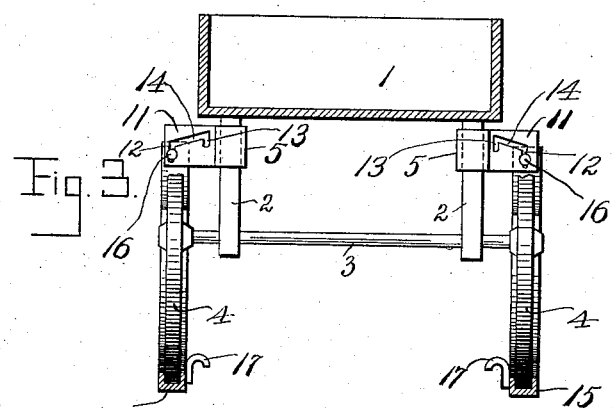

In the accompanying drawings, illustrating the preferred embodiments of my invention: Figure 1 is a side view of a four-wheeled cart equipped with my attachment, the runners being arranged in operative position. Fig. 2 is a similar view showing the runners raised out of contact with the ground. Fig. 3 is a vertical cross section of the vehicle, as illustrated in Fig. 1. Fig. 4 is a front elevation of the vehicle, as shown in Fig. 2. Fig. 5 is a broken sectional view on the line $x$—$x$ of Fig. 1. Fig. 6 is a detailed face view of the adjustable clamp which supports the runner. Fig. 7 is a sectional view, on an enlarged scale, on the line $y$—$y$ of Fig. 1, and Fig. 8 is a similar view taken on the line $z$—$z$ of Fig. 2.

Referring more particularly to the drawings, 1 designates the platform of a truck, 2 the hangers which support the axles 3, and 4 are the wheels mounted on said axles. To each of said hangers, at a point below the platform, I attach clamps or supporting plates 5, each of which comprises a portion 6 extending toward the end of the truck a distance substantially equal to the radius of the wheels and a portion 7 mounted to slide thereon. The parts 6 and 7 have facing jaws 8 and 9, respectively, which grip the hanger 2. The portion 7 is provided with an elongated slot through which a bolt projects from the part 6. The projecting end of said bolt is fitted with a thumb nut whereby the part 7 may be clamped to the part 6 at the desired point. If necessary or desirable, a pin or rivet 10 may be used for guiding the part 7 on the part 6. The extremity of the part 6, which is arranged vertically above the point of the rim of the wheel which extends farthest toward the end of the trunk, is turned or bent outwardly, as at 11, and extends transversely of the truck into the vertical plane of the wheels. This bent portion 11 of each supporting member is provided with an irregular slot comprising two vertical portions 12 and 13, and an inclined portion 14 connecting said vertical portions. The longer vertical portion 12 is arranged in the plane of the wheels, while the other vertical portion is arranged well inward of the wheels.

Each of the runners 15 is made of a channel bar adapted to fit the wheels, and it is so shaped as to extend between the two wheels on one side of the truck and conform to the outer portion of each wheel. In other words, the ends of the runners are curved to conform to the curvature of the wheels and the straight middle portions thereof are equal in length to the distance between the treads of the two wheels on the same side of the vehicle. Each extremity of each runner is connected to the bent portion 11 of one of the supporting plates by means of a bolt 16 which passes loosely through the slot in said bent portion of the support.

When the runners are not in use, they are supported vertically above the ground and arranged inwardly of the wheels, as illustrated in Figs. 2 and 4. In that position, the bolts 16 are arranged in the shorter vertical portions 13 of the irregular grooves in the bent portions 11 of the supporting plates, as shown in Fig. 8. When it is desired to use the runners, that is use the truck as a sleigh, the runners are raised slightly so as to move the bolts 16 from the vertical portions 13 of the slots into the inclined portions 14. Said bolts are then moved outwardly and downwardly throughout the length of the inclined portion 14 of the slots and dropped into the vertical portions 12 thereof which are made long enough to permit the channeled runners to pass below the wheels which must, of course, be lifted during this operation in order to permit the flanges on the runners to escape the rims of the wheels. The wheels are then dropped into the channeled runners, causing the bolts to assume the position in the slots 12, indicated in Fig. 7. It will thus be seen that the incline of the slots 14 is sufficient to lower the runners from their inactive position above the road to the position which they assume when in use below the wheels.

It will be observed that my attachment provides for carrying the runners in an out of the way place when not in use and still at points from whence they can be conveniently and very quickly adjusted into operative positions. I preferably provide a handle 17 near the middle of each runner for conveniently raising or adjusting it.

I claim:

1. The combination, with a wheeled vehicle, of pairs of verticle plates arranged transversely of the vehicle at each side thereof, each of said plates being provided with an oblique slot extending at its lower end into the vertical plane of the wheels at one side of the vehicle, and sleigh runners having bolts engaging the slots in the respective pairs of plates for permitting said runners to hang in the plane of the wheels when in use, and out of said plane and above the road-engaging portions of said wheels when not in use.

2. The combination, with a wheeled vehicle, of slotted plates arranged transversely thereof, sleigh runners having bolts attached to their extremities and engaging the slots in said transverse plates, said slots comprising two vertical portions, one arranged in the plane of the wheels, and the other arranged inward of said plane, and an inclined portion extending upwardly from the outer to the inner vertical portions whereby said runners may be supported above and out of contact with the road engaging portions of said wheels when said bolts are arranged in the inner vertical portions of the slots, and said runners may be dropped into position under said wheels by moving said bolts to the outer vertical portions of said slots.

3. The combination, with a wheeled vehicle, of slotted plates arranged transversely thereof, sleigh runners having bolts attached to their extremities and engaging the slots in said transverse plates, said slots comprising two vertical portions, one arranged in the plane of the wheels and the other arranged inward of said plane, said outer vertical portions being longer than the inner ones for the purpose specified, and an inclined portion extending upwardly from the outer to the inner vertical portions whereby said runners may be supported above and out of contact with the road-engaging portions of said wheels when said bolts are arranged in the inner vertical portions of the slots, and said runner may be dropped into position under said wheels by moving said bolts to the outer vertical portions of said slots.

In testimony whereof, I affix my signature, in presence of two witnesses.

CLARENCE E. HUBER.

Witnesses:
 JAS. W. GALBRAITH,
 D. S. HOOSER.

---

Copies of this patent may be obtained for five cents each, by addressing the "Commissioner of Patents, Washington, D. C."